(12) United States Patent
Hong

(10) Patent No.: US 10,648,716 B2
(45) Date of Patent: May 12, 2020

(54) AIR CONDITIONER

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/710,539

(22) Filed: Sep. 20, 2017

(65) Prior Publication Data

US 2018/0112898 A1    Apr. 26, 2018

(30) Foreign Application Priority Data

Oct. 20, 2016  (KR) .................. 10-2016-0136601
Mar. 28, 2017  (KR) .................. 10-2017-0039213

(51) Int. Cl.
| | | |
|---|---|---|
| *F25B 41/00* | (2006.01) | |
| *F16L 9/06* | (2006.01) | |
| *F25B 1/00* | (2006.01) | |
| *F25B 1/08* | (2006.01) | |
| *F16L 9/14* | (2006.01) | |
| *F16L 11/00* | (2006.01) | |
| *C22C 38/58* | (2006.01) | |

(52) U.S. Cl.
CPC .............. *F25B 41/003* (2013.01); *F16L 9/06* (2013.01); *F25B 1/00* (2013.01); *C22C 38/58* (2013.01); *F16L 9/14* (2013.01); *F16L 11/00* (2013.01); *F25B 1/08* (2013.01); *F25B 2500/06* (2013.01); *F25B 2500/13* (2013.01)

(58) Field of Classification Search
CPC ...... F25B 41/003; F25B 1/00; F25B 2500/06; F25B 2500/13; F25B 1/08; F16L 9/06; F16L 11/00; F16L 9/14; C22C 38/58
See application file for complete search history.

(56) References Cited

U.S. PATENT DOCUMENTS

| | | | | |
|---|---|---|---|---|
| 4,865,362 A | * | 9/1989 | Holden | ................ F16L 11/111 285/260 |
| 5,135,265 A | * | 8/1992 | Bouscher | ................ F16L 39/04 138/112 |
| 5,676,176 A | * | 10/1997 | Usui | ................ F16L 9/06 138/121 |
| 6,094,922 A | * | 8/2000 | Ziegler | ................ F16L 59/065 138/114 |

(Continued)

FOREIGN PATENT DOCUMENTS

| | | |
|---|---|---|
| JP | 2005-106367 A | 4/2005 |
| KR | 10-1998-0083654 A | 12/1998 |

(Continued)

*Primary Examiner* — Joel M Attey
(74) *Attorney, Agent, or Firm* — Dentons US LLP

(57) ABSTRACT

An air conditioner includes a stainless steel pipe having one end connected to a compressor and the other end connected to a refrigeration cycle component to form a single pipe between the compressor and the refrigeration cycle component, the stainless steel pipe partially having a corrugated part to attenuate vibration transferred from the compressor to the refrigeration cycle component, wherein the corrugated part is integrally formed with the other portion of the stainless steel pipe as at least a portion of the stainless steel pipe is processed.

18 Claims, 14 Drawing Sheets

(56) References Cited

U.S. PATENT DOCUMENTS

| | | | | |
|---|---|---|---|---|
| 6,460,520 | B1* | 10/2002 | Challis | F28D 7/16 |
| | | | | 123/41.01 |
| 8,925,591 | B2* | 1/2015 | Kramer, Jr. | B29C 53/305 |
| | | | | 138/121 |
| 2004/0156737 | A1* | 8/2004 | Rakowski | C22C 38/02 |
| | | | | 420/53 |
| 2006/0019048 | A1 | 1/2006 | Nakano et al. | |
| 2006/0151041 | A1* | 7/2006 | Koizumi | B21D 15/06 |
| | | | | 138/118 |
| 2007/0013189 | A1* | 1/2007 | Duquette | F16L 19/04 |
| | | | | 285/386 |
| 2009/0071652 | A1* | 3/2009 | Vinegar | E21B 36/04 |
| | | | | 166/303 |
| 2009/0260823 | A1* | 10/2009 | Prince-Wright | C10G 21/22 |
| | | | | 166/302 |
| 2010/0183893 | A1 | 7/2010 | Duquette et al. | |
| 2019/0200839 | A1* | 7/2019 | Lee | A47L 15/06 |

FOREIGN PATENT DOCUMENTS

| | | |
|---|---|---|
| KR | 10-2003-0074232 A | 9/2003 |
| KR | 20-2012-0005558 U | 8/2012 |
| KR | 10-2014-0059951 A | 5/2014 |

* cited by examiner

AIR CONDITIONER

CROSS-REFERENCE TO RELATED APPLICATIONS

The present application claims the benefits of priority to Korean Patent Application No. 10-2016-0136601, filed on Oct. 20, 2016, and Korean Patent Application No. 10-2017-0039213, filed on Mar. 28, 2017, which are herein incorporated by reference in their entireties.

BACKGROUND

The present disclosure relates to an air conditioner including a pipe configured to attenuate vibration generated in a refrigeration cycle.

An air conditioner refers to an apparatus that cools or heats an indoor space by using a refrigeration cycle. The refrigeration cycle includes a compressor, a condenser, an expansion device, and an evaporator, and the compressor, the condenser, the expansion device, and the evaporator are sequentially connected by pipes. A refrigerant circulates the compressor, the condenser, the expansion device, and the evaporator through the pipes.

A flow path is formed in the condenser and the evaporator in the refrigeration cycle. The refrigerant is heat-exchanged with surroundings while passing through the flow path formed in the condenser and the evaporator to be condensed or evaporated, and the condenser and the evaporator serve as a heat exchanger. The flow path is used to allow the refrigerant to flow therethrough, and the refrigerant flows in the flow path. Hence, the flow path is a concept included in the pipe in a broad sense.

Such a pipe connects components of the refrigeration cycle to each other, and is used as a flow path of the compressor and the condenser. The conventional pipe is mainly made of a copper (Cu) material. However, pipes made of copper have a few problems.

First, the copper has a limitation in reliability due to occurrence of corrosion. In the case of a chiller heat transfer pipe, the chiller heat transfer pipe is cleaned or replaced to remove scales, etc. therein.

Next, the copper does not sufficiently have a high pressure resistance property when it is used for a flow path of a new high-pressure refrigerant such as R32. If a pipe made of the copper is used as a flow path of a new high-pressure refrigerant, the pipe does not endure high pressure as time elapses and therefore may be damaged.

In order to solve problems of such copper pipes, Korean Patent Laid-Open Publication No. 2003-0074232 has disclosed a stainless steel pipe. The stainless steel pipe is made of a stainless steel material, and the stainless steel material generally has a strong corrosion resistance as compared with the copper material. Thus, the stainless steel tube can solve the problem of the copper pipes, i.e., the occurrence of corrosion. In addition, the stainless steel material has a sufficient high pressure resistance property, and hence it is less likely that the stainless steel material will be damaged even at high pressure.

However, the conventional stainless steel material including the stainless steel pipe disclosed in Korean Patent Laid-Open Publication No. 2003-0074232 has properties of excessively high strength and hardness as compared with the copper material, and therefore, there occurs a problem of processability, which does not occurs in the copper pipes.

The pipe used in the air conditioner may be formed in not only a linear shape but also curved shape due to spatial constraints. One portion of the pipe may be formed in a linear shape, and another portion of the pipe may be formed in a curved shape. A linear pipe refers to a pipe extending in one direction along a straight line, and a curved pipe refers to a pipe curved along a curve.

However, since the conventional stainless steel material has properties of excessively high strength and hardness as compared with the copper material, it is very difficult to manufacture a curved pipe using the stainless steel material (see FIG. 1). For example, although a linear pipe made of the stainless steel material is processed as a curved pipe by mechanically applying a force to the linear pipe, the linear pipe is not completely plastically deformed but partially plastically deformed. Therefore, sufficient processing is not performed.

In particular, it is known that the stainless steel material essentially has properties of high strength and high hardness. Therefore, it is recognized that it is difficult to improve the processability of the stainless steel material as long as the stainless steel material is used.

Moreover, since the pipe occupies 10% or more of the total material cost of the air conditioner, a demand for improving the performance of the pipe and reducing the cost of the pipe is continuously increasing.

Meanwhile, the compressor is configured to compress the refrigerant, and vibration is generated from the compressor in a process of compressing the refrigerant. The vibration generated from the compressor are transferred to another component of the refrigeration cycle along the pipe, which causes noise, and becomes the cause that decreases the durability of the air conditioner from a long-term point of view. In addition, the vibration and noise cause a pressure drop of the refrigerant passing through the pipe, and hence the efficiency of the refrigeration cycle is deteriorated.

Conventionally, there was a case where a flexible pipe is applied so as to solve such a problem. The flexible pipe refers to a pipe having a structure in which the outer circumferential surface of the flexible pipe is surrounded by a wire braid.

If the flexible pipe is applied to the refrigeration cycle, vibration can be attenuated to a certain degree. However, the flexible pipe does not have sufficient durability due to local cohesiveness. In addition, a pressure drop occurs in the refrigerant passing through the flexible pipe, and therefore, the efficiency of the refrigeration cycle is deteriorated.

Accordingly, the introduction of a new pipe for solving the conventional problems is required.

SUMMARY

Embodiments also provide a stainless pipe having a structure capable of attenuating the transfer of vibration generated in a process of compressing a refrigerant to another refrigeration cycle component along the pipe, and an air conditioner including the stainless pipe.

Embodiments also provide a stainless pipe having a corrugated part integrally formed with the pipe without any junction part so as to reduce the concentration of stresses generated at the junction part, and an air conditioner including the stainless pipe.

Embodiments also provide a stainless pipe having a structure capable of reducing a pressure drop generated in a refrigerant passing through the pipe, and an air conditioner including the stainless pipe.

Embodiments also provide a structure of a corrugated part, which enables the corrugated part to be easily bent with only a small force, and a size of the corrugated part, which can reduce the concentration of stresses and prevent a pressure drop of a refrigerant.

Embodiments also provide a stainless pipe capable of simplifying the pipe structure of an air conditioner.

Embodiments provide a new stainless steel material having a new composition capable of preventing the problem of corrosion resistance and pressure resistance, which the copper material has, and solving the problem of high strength and high hardness, which the conventional stainless steel material.

Embodiments also provide a pipe capable of ensuring sufficient processability through a new stainless steel material that has excellent ductility as compared with the conventional stainless steel.

Embodiments also provide a pipe made of a stainless steel material, and a system including the pipe.

In an embodiment, a stainless steel is defined by a composition, a matrix structure, and an average diameter thereof.

The stainless steel is composed of, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, N: 0.03% or less, and the balance: residue: Fe, and incidental impurities.

The matrix structure of the stainless steel includes austenite. The matrix structure of the stainless steel most preferably includes only the austenite. The matrix structure of the stainless steel may include austenite and δ-ferrite. In this case, the austenite is to occupy most of the matrix structure based on the grain size area of the stainless steel. The stainless steel may have an austenite matrix structure of 99% or more based on the grain size area thereof, and have a δ-ferrite matrix structure of 1% or less based on the grain size area thereof.

The stainless steel has an average diameter of 30 to 60 μm. An American Society for Testing and Materials (ASTM) grain size number of the stainless steel corresponds to 5.0 to 7.0.

In addition, a pipe made of stainless steel, i.e., a stainless pipe is made of the above-described stainless steel. As described above, the stainless steel is defined by a composition, a matrix structure, and an average diameter thereof.

In an embodiment, an air conditioner includes a stainless pipe having a corrugated part. In particular, the corrugated part is integrally formed with the other portion of the stainless pipe as at least a portion of the stainless pipe is processed.

The stainless pipe forms a single pipe between a compressor and a refrigeration cycle component. For example, one end of the stainless pipe is connected to the compressor, and the other end of the stainless pipe is connected to the refrigeration cycle component. Here, the compressor means all components configured to compress a refrigerant, and the refrigeration cycle component means a component connected to the compressor by the stainless pipe.

The refrigeration cycle component is a device that is installed at at least one of an upstream side and a downstream side of the compressor to supply the refrigerant to the compressor or be supplied with the refrigerant from the compressor. The refrigeration cycle component and the compressor form a part of a refrigeration cycle.

The corrugated part may be thinner by a thickness of exceeding 0 to 5% or less than a region in which the corrugated part does not exist.

The corrugated part may be formed such that ridges and valleys are repeatedly alternately disposed, and a thickness (T1) of the stainless pipe at the ridge, a thickness (T2) of the stainless pipe at the valley, and a thickness (T3) of the stainless pipe between the ridge and the valley may have differences of exceeding 0 to 2% or less.

The corrugated part may be formed such that ridges and valleys are repeatedly alternately disposed, and 2 to 5 ridges may be formed for each length of 1 cm along the length direction of the stainless pipe.

A distance between two adjacent ridges may be 8 mm or less.

The stainless pipe may include a bent region formed as at least a partial region of the stainless pipe is bent.

The corrugated part may be formed in the bent region.

The stainless pipe may include a linear region, and the corrugated part may be formed throughout the linear region and the bent region.

The ridges of the corrugated part may be formed to be spaced apart from each other, and the valleys of the corrugated part may be formed to be spaced apart from each other. In other words, the corrugated part comprises individual or separate ridges and valley alternately arranged.

The ridge of the corrugated part protrudes in a circular shape along a direction perpendicular to an outer circumferential surface of the stainless pipe.

A distance difference between an external diameter at the ridge and an external diameter at the valley may be 2.8 to 3.2 mm.

An external diameter at the valley may have a thickness difference of exceeding 0 to 2% or less from that in a region in which the corrugated part does not exist, and an internal diameter at the valley may have a thickness difference of exceeding 0 to 2% or less from that in the region in which the corrugated part does not exist.

The stainless pipe may have a copper junction part at at least one end portion thereof. The copper junction part may be made of copper having the shape of a linear pipe, and be joined to an outer circumferential surface or inner circumferential surface of the end portion.

The stainless steel of the present disclosure can have properties of low strength and low hardness, as compared with the conventional stainless steel, through a composition including copper (Cu), a matrix structure configured with austenite, and an average diameter of 30 to 60 μm. The conventional stainless steel has the problem of processability due to strength and hardness, which are excessively higher than those of the copper, and accordingly, a bent pipe has been manufactured using the stainless steel of the present disclosure.

Since the stainless steel of the present disclosure has strength and hardness to the same level as the copper, sufficient processability can be ensured, and the stainless steel of the present disclosure can be used to manufacture pipes (linear or bent pipes) required in a system such as an air conditioner. In particular, when a bent pipe is manufactured using the stainless steel of the present disclosure, it is possible to solve the conventional problem that plastic deformation is not sufficiently made.

In addition, when a pipe is manufactured using the stainless steel of the present disclosure, heat loss reduction and corrosion resistance performance can be ensured. The heat loss reduction and the corrosion resistance performance are intrinsic properties of the stainless steel material. Thus, although the stainless steel of the present disclosure has low strength and low hardness as compared with the conventional stainless steel, the stainless steel of the present disclosure keeps the intrinsic properties of the stainless steel material.

Although the pipe made of the stainless steel material of the present disclosure is formed thinner than the copper pipe, the pipe can have a limit pressure and a limit bending moment, which are similar to those of the copper pipe. Thus, an optimum stainless pipe can be designed through the minimum thickness of the stainless steel pipe proposed in the present disclosure.

In addition, since the stainless pipe has a corrugated part, it is possible to attenuate the transfer of vibration in the process of compressing the refrigerant in the compressor.

In particular, since the corrugated part is integrally formed with the other part of the stainless pipe, it is possible to implement a structure having no junction part, and it is possible to prevent in advance the concentration of stresses. Further, since the corrugated part is integrally formed with the other part of the stainless pipe, the corrugated part can be formed at any position of the stainless pipe.

In addition, the stainless pipe of the present disclosure has an almost constant thickness at all parts of the stainless pipe including the corrugated part. Thus, in the stainless pipe of the present disclosure, sufficient strength can be ensured without any wire braid, and it is possible to solve the pressure drop of the refrigerant and the problem of vibration and noise, which may occur due to non-uniformity of thickness.

In addition, since the corrugated part has a structure in which ridges and valleys are very densely formed, the inner circumferential surface of the corrugated part can be formed similar to a smooth surface. Thus, in the stainless pipe of the present disclosure, it is possible to solve the pressure drop of the refrigerant and the problem of vibration and noise, which may occur due to a rough and uneven inner circumferential surface.

As the ridges of the corrugated part are formed to be spaced apart from each other and the valleys of the corrugated part are formed to be spaced apart from each other, the corrugated part does not interfere with bending of the stainless pipe. While it is difficult to bend a pipe having a corrugated part with a spiral structure due to the corrugated part with the spiral structure, the stainless pipe of the present disclosure can be easily bent with a relatively small force.

By using the stainless pipe of the present disclosure, with which the corrugated part is integrally formed, it is possible to prevent the transfer of vibration and noise using a small number of bent regions, so that the pipe structure of the air conditioner can be simplified.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DETAILED DESCRIPTION OF THE EMBODIMENTS

Figure 1:
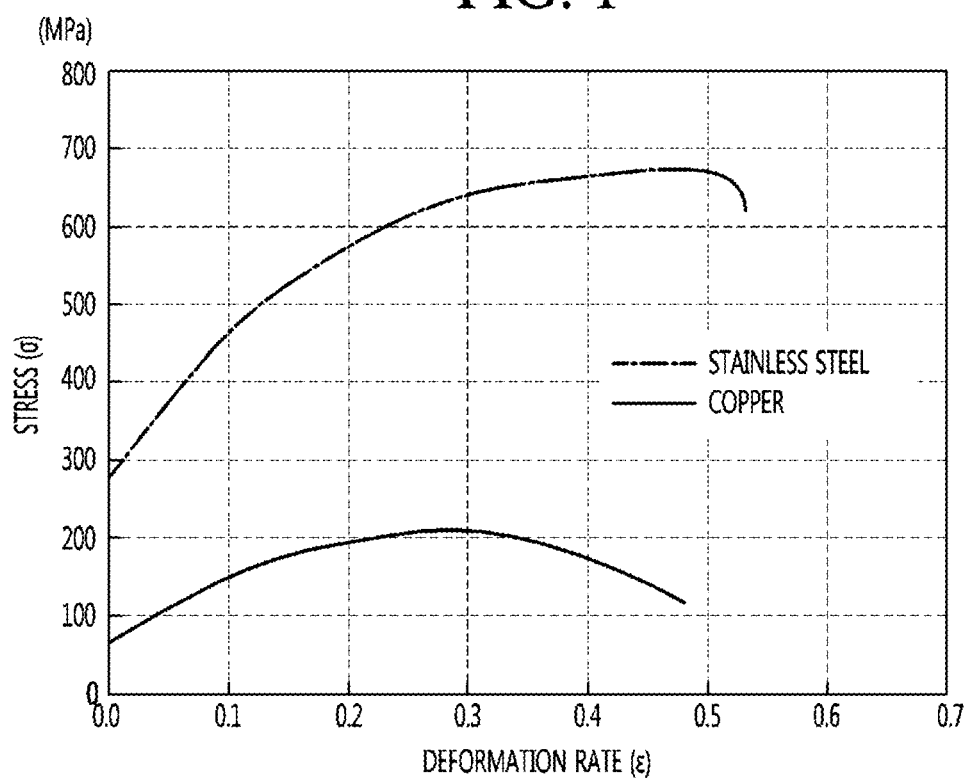
FIG. 1 is a stress-deformation rate graph obtained by comparing properties of stainless steel and copper.

Hereinafter, exemplary embodiments of the present disclosure will be described in detail with reference to the accompanying drawings. Even though embodiments are different from each other in this specification, the same or similar components are denoted by the same or similar reference numerals and the description thereof is replaced with the first description. As used herein, the singular forms are intended to include the plural forms as well, unless the context clearly indicates otherwise A stainless steel of the present disclosure shows properties of low strength and low hardness as compared with the conventional stainless steel. The stainless steel of the present disclosure has strength and hardness to the same level as those of the copper material. The properties of low strength and low hardness of the stainless steel can be identified by yield strength, tensile strength, hardness, and elongation of the stainless steel of the present disclosure, and comparing them with those of the copper material, etc. If the stainless steel has properties of strength and hardness to the same level as those of the copper material, the problem of processability that was problematic in the conventional stainless steel can be solved.

The properties of low strength and low hardness of the stainless steel are determined by the composition, matrix structure, and average diameter of the stainless steel. Hereinafter, items that determine the properties of low strength and low hardness of the stainless steel will be described. Hereinafter, each content is designated by weight percent (wt %) as long as it is not particularly indicated.

1. Composition of Stainless Steel (1) Carbon (C): 0.03% or less

The stainless steel of the present disclosure includes carbon (C) and chromium (Cr). The carbon is precipitated as chromium carbide by reacting with the chromium. In this case, the chromium is exhausted at a grain boundary or surroundings thereof, which becomes a cause of corrosion. Therefore, the content of the carbon is preferably maintained small. If the content of the carbon exceeds 0.03%, it is difficult to provide the stainless steel with strength and hardness to the same level as those of the copper material, and it is difficult to ensure sufficient processability by using properties of low strength and low hardness. Thus, in the present disclosure, the content of the carbon is set to 0.03% or less such that the stainless steel has low strength and low hardness to the same level as those of the copper material, and accordingly, sufficient processability is ensured.

(2) Silicon (Si): Exceeding 0 to 1.7% or less

Austenite has a low yield strength as compared with ferrite or martensite. Therefore, the matrix structure of the stainless steel is to be made of the austenite such that the stainless steel of the present disclosure has the properties of low strength and low hardness to the same level as those of the copper material.

However, silicon is an element that forms the ferrite. As the content of the silicon is increased, the ratio of the ferrite in the matrix structure is increased, and the stability of the ferrite is also increased. Therefore, the content of the silicon is preferably maintained small. If the content of the silicon exceeds 1.7%, it is difficult to provide the stainless steel with strength and hardness to the same level as those of the copper material, and it is difficult to ensure sufficient processability. Thus, in the present disclosure, the content of the silicon is set to 1.7% or less such that the stainless steel has low strength and low hardness to the same level as those of the copper material, and accordingly, sufficient processability is ensured.

(3) Manganese (Mn): 1.5 to 3.5%

Manganese is an element required to prevent the matrix structure of the stainless steel from being phase-transformed into that of martensite. If the content of the manganese is less than 1.5%, the effect that the phase transformation is prevented by the manganese is not sufficiently exhibited. Thus, in the present disclosure, the lowest limit of the content of the manganese is set to 1.5% so as to sufficiently obtain the effect that the phase transformation is prevented by the manganese.

However, as the content of the manganese is increased, the yield strength of the stainless steel is increased, and therefore, the stainless steel cannot have a property of low strength to the same level as that of the copper material. Thus, in the present disclosure, the highest limit of the content of the manganese is set to 3.5% such that the stainless steel has the property of low strength.

(4) Chromium (Cr): 15.0 to 18.0%

Chromium is an element that improves corrosion initiation resistance of the stainless steel. Corrosion initiation means that corrosion first occurs in a base material in a state in which no corrosion exists in the base material, and the corrosion initiation resistance means a property that prevents corrosion from first occurring in the base material. If the content of the chromium is lower than 15.0%, the stainless steel does not have sufficient corrosion initiation resistance. Thus, in the present disclosure, the lowest limit of the content of the chromium is set to 15.0% such that the stainless steel has sufficient corrosion initiation resistance.

However, if the content of the chromium is excessively increased, the strength of the stainless steel is increased, but the elongation of the stainless steel is decreased. If the content of the chromium exceeds 18.0%, the increment of the strength of the stainless steel and the decrement of the elongation of the stainless steel are increased, and therefore, it is difficult to ensure sufficient processability of the stainless steel. Thus, in the present disclosure, the highest limit of the content of the chromium is set to 18.0% such that the stainless steel has sufficient processability.

Further, since the chromium is a high-priced element, the content of the chromium has influence on the economic feasibility of the stainless steel. Thus, the content of the chromium is set to the above-described range such that the economic feasibility of the stainless steel is ensured.

(5) Nickel (Ni): 7.0 to 9.0%

Nickel is an element that improves corrosion growth resistance. Corrosion growth means that corrosion that has already occurred in a base material is grown while being spread in a wide range, and the corrosion growth resistance means a property that prevents the growth of corrosion. The corrosion growth resistance is conceptually different from the corrosion initiation resistance. If the content of the nickel is lower than 7.0%, the stainless steel does not have sufficient corrosion growth resistance. Thus, in the present disclosure, the lowest limit of the content of the nickel is set to 7.0% such that the stainless steel has sufficient corrosion growth resistance.

However, if the content of the nickel is excessively increased, the strength and hardness of the stainless steel are increased. If the content of the nickel exceeds 9.0%, the increment of the strength of the stainless steel and the increment of the hardness of the stainless steel are increased, and therefore, it is difficult to ensure sufficient processability of the stainless steel. Thus, in the present disclosure, the highest limit of the content of the nickel is set to 9.0% such that the stainless steel ensures sufficient processability.

Further, since the nickel is a high-priced element, the content of the nickel has influence on the economic feasibility of the stainless steel. Thus, the content of the nickel is set to the above-described range such that the economic feasibility of the stainless steel is ensured.

(6) Copper (Cu): 1.0 to 4.0%

Copper is an element required to prevent the matrix structure of the stainless steel from being phase-transformed into that of martensite. If the content of the copper is less than 1.0%, the effect that the phase transformation is prevented by the copper is not sufficiently exhibited. Thus, in the present disclosure, the lowest limit of the content of the copper is set to 1.0% so as to sufficiently obtain the effect that the phase transformation is prevented by the copper. In particular, the content of the copper is necessarily to be strictly managed to 1.0% or more such that the stainless steel of the present disclosure properties of low strength and low hardness to the same level as those of the copper. As the stainless steel of the present disclosure includes the copper having a content of 1.0% or more, the stainless steel may be classified into a Cu-based stainless steel.

As the content of the copper is increased, the phase transformation effect of the copper is increased, but the increment of the phase transformation effect is gradually decreased. If the content of the copper exceeds 4.0%, the effect that the phase transformation is prevented by the copper is saturated. Since copper is a high-priced element, the content of the copper has influence on the economic feasibility of the stainless steel. Thus, the highest limit of the content of the copper is set to 4.0% such that the economic feasibility of the stainless steel is ensured within a range in which the effect that the phase transformation is prevented by the copper is saturated.

(7) Molybdenum (Mo): 0.03% or less (8) Phosphorus (P): 0.04% or less (9) Sulfur (S): 0.04% or less

(10) Nitrogen (N): 0.03% or less

Molybdenum, phosphorus, sulfur, and nitrogen are elements that are originally included in steel semi-finished products, and harden the stainless steel. Therefore, each of the molybdenum, the phosphorus, the sulfur, and the nitrogen is preferably maintained to have a content as low as possible. The molybdenum may improve corrosion resistance of the stainless steel, but further hardens the stainless steel, as compared with when the molybdenum improves the corrosion resistance of the stainless steel. Hence, the content of the molybdenum is to be managed to 0.03% or less. The phosphorus, the sulfur, and the nitrogen are respectively set to 0.04% or less, 0.04% or less, and 0.03% or less so as to prevent the stainless steel from being hardened.

2. Matrix Structure of Stainless Steel

The matrix structure of the stainless steel may be determined based on a composition and/or a heat treatment condition. Typically, a matrix structure of stainless steel is divided into austenite, ferrite, and martensite. Properties of the stainless steel are changed depending on matrix structures of the austenite, the ferrite, and the martensite.

The stainless steel of the present disclosure has the matrix structure of the austenite. The austenite corresponds to a matrix structure that exhibits properties of low yield strength and low hardness as compared with the ferrite or the martensite. Further, an average diameter which will be described later is a limitation item that is satisfied by growing the crystal size of the stainless steel. When crystal sizes are grown by processing the three matrix structures under the same condition, the austenite can obtain the highest effect of low strength and low hardness.

The matrix structure of the stainless steel is most preferably configured with only the austenite. However, it is very difficult to control the matrix structure of the stainless steel using only the austenite, and hence the stainless steel may include not only the matrix structure of the austenite but also another matrix structure. In this case, in order to obtain properties of low strength and low hardness, the stainless steel is to have the matrix structure of the austenite, which is 90% or more, preferably, 99% or more, based on the grain size area thereof. For example, when the stainless steel includes the matrix structure of the austenite and the matrix structure of $\delta$-ferrite, the stainless steel is to have the matrix structure of the austenite, which is 99% or more, and the matrix structure of the $\delta$-ferrite, which is 1% or less, based on the grain size area thereof.

The properties of the stainless steel are changed depending on the matrix structure of the stainless steel. Embodiment 1 and Embodiment 2 are set and compared with each other so as to evaluate the properties of the stainless steel depending on the matrix structure of the stainless steel.

Figure 2A:
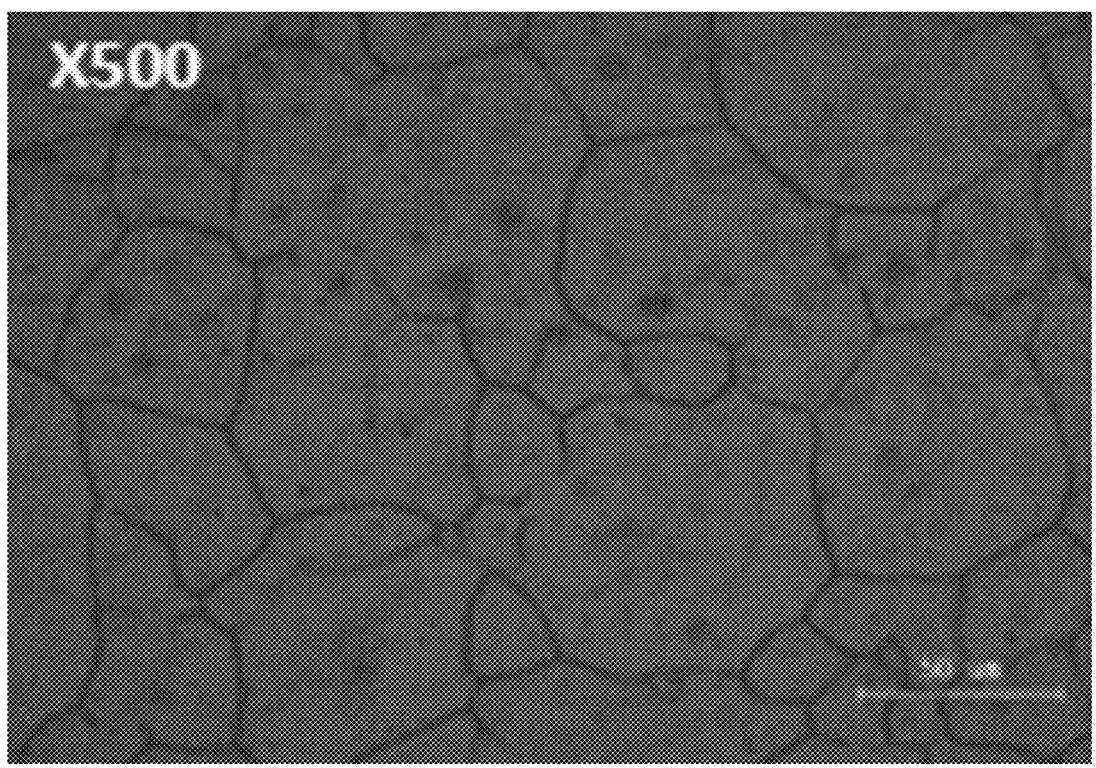
FIG. 2A is a microstructure photograph showing a stainless steel according to Embodiment 1 of the present disclosure.
Figure 2B:
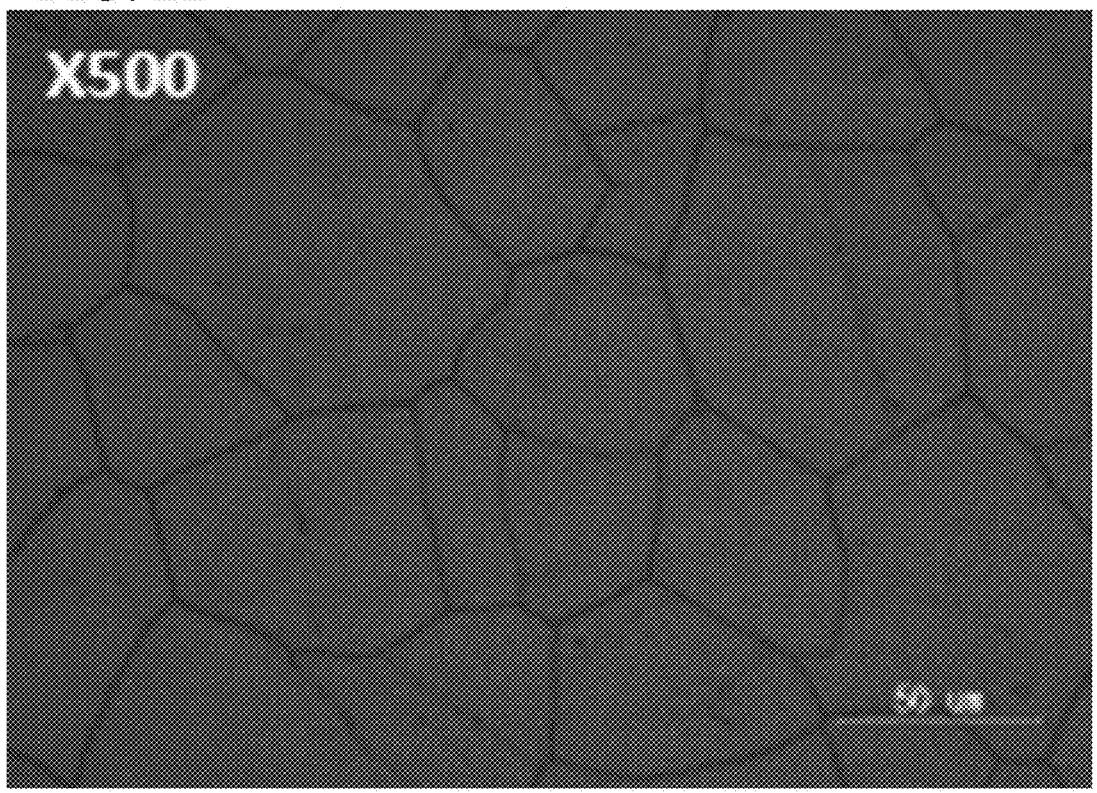
FIG. 2B is a microstructure photograph showing a stainless steel according to Embodiment 2 of the present disclosure.

FIG. 2A is a microstructure photograph showing a stainless steel according to Embodiment 1 of the present disclosure. FIG. 2B is a microstructure photograph showing a stainless steel according to Embodiment 2 of the present disclosure.

The stainless steels of Embodiments 1 and 2 have the same composition described in [1. Composition of Stainless Steel]. Also, the stainless steels of Embodiments 1 and 2 have average diameters corresponding to a grain size number of 5.0 to 7.0 which will be described in [3. Average Diameter of Stainless Steel]. However, while the stainless steel of Embodiment 1 has the matrix structure of the austenite, which is 99% or more, and the matrix structure of the ferrite, which is 1% or less, based on the grain size area thereof, the stainless steel of Embodiment 2 has only the matrix structure of the austenite.

Results obtained by comparing the stainless steels of Embodiments 1 and 2 with each other are shown in the following Table 1.

TABLE 1

| | | Mechanical properties | | | |
| --- | --- | --- | --- | --- | --- |
| | Kinds | Yield strength [MPa] | Tensile strength [MPa] | Hardness [Hv] | Elongation [%] |
| Embodiment 1 | Stainless steel (austenite + $\delta$- ferrite]) | 180 | 500 | 120 | 52 |
| Embodiment 2 | Stainless steel (austenite) | 160 | 480 | 110 | 60 |

From Table 1, it can be seen that the stainless of Embodiment 2 has properties of low strength and low hardness as compared with the stainless steel of Embodiment 1. In addition, the stainless steel of Embodiment 2 has a high elongation as compared with the stainless steel of Embodiment 1. Therefore, the stainless steel is preferably configured with only the matrix structure of the austenite such that the stainless steel has the property of low strength and low hardness. As the ratio of the matrix structure of the $\delta$-ferrite is increased, the strength and hardness of the stainless steel are increased. Therefore, although the stainless steel has the matrix structure of the $\delta$-ferrite, the ratio of the matrix structure of the $\delta$-ferrite is to be 1% or less, based on the grain size area of the stainless steel.

Even when the stainless steel has the matrix structure of the $\delta$-ferrite, which is 1% or less, the $\delta$-ferrite are not uniformly distributed in all crystal grains but locally gathered (concentrated) and distributed in a specific crystal grain, which is advantageous in implementation of low strength and low hardness.

3. Average Diameter of Stainless Steel

The average diameter of the stainless steel may be determined based on a composition and/or a heat treatment condition. The average diameter of the stainless steel has influence on the strength and hardness of the stainless steel. For example, as the average diameter of the stainless steel is decreased, the strength and hardness of the stainless steel is increased. As the average diameter of the stainless steel is increased, the strength and hardness of the stainless steel is decreased.

In the present disclosure, the average diameter of the stainless steel is limited to 30 to 60 µm so as to ensure the properties of low strength and low hardness of the stainless steel. In general, the average diameter of the austenite is smaller than 30 µm. Therefore, the average diameter is to be grown to 30 µm or more through a manufacturing process and heat treatment. According to the standard of American Society for Testing and Materials (ASTM), the average diameter of 30 to 60 µm corresponds to a grain size number of 5.0 to 7.0. On the other hand, the average diameter smaller than 30 µm corresponds to an ASTM grain size number of 7.5 or more.

If the average diameter of the stainless steel is smaller than 30 µm or if the grain size number of the stainless steel is greater than 7.0, the stainless steel does not have the properties of low strength and low hardness, which are required in the present disclosure. In particular, the average diameter (or grain size number) of the stainless steel corresponds to a key factor that determines the properties of low strength and low hardness, which are provided to the stainless steel.

Properties of the stainless steel are changed depending to the average diameter of the stainless steel. Embodiments and Comparative Examples are set and compared with each other so as to evaluate the properties of the stainless steel depending on the average diameter of the stainless steel.

Comparative Example 1 is copper, Comparative Examples 2 to 5 are stainless steels having grain size numbers of 7.5 or more, and Embodiment 3 of the present disclosure is a stainless steel having a grain size number of 6.5.

Figure 3:
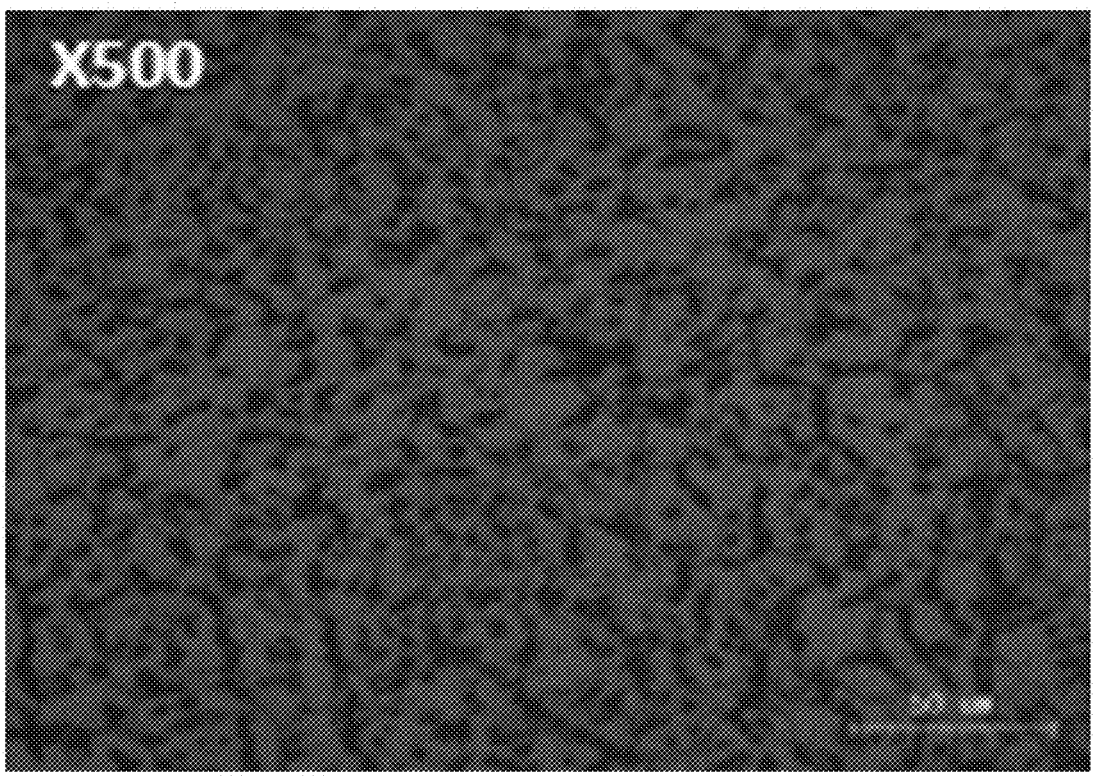
FIG. 3 is a microstructure photograph showing stainless steels according to Comparative Example 2.

FIG. 3 is a microstructure photograph showing the stainless steel according to Embodiment 2. The stainless steel of Embodiment 2 has the matrix structure of the austenite, which is 99% or more, and the matrix structure of the δ-ferrite, which is 1% or less, based on the grain size area thereof. The stainless steel of Embodiment 2 has an average diameter (about 15 to 17 µm) corresponding to an ASTM grain size number of 9.

Figure 4:
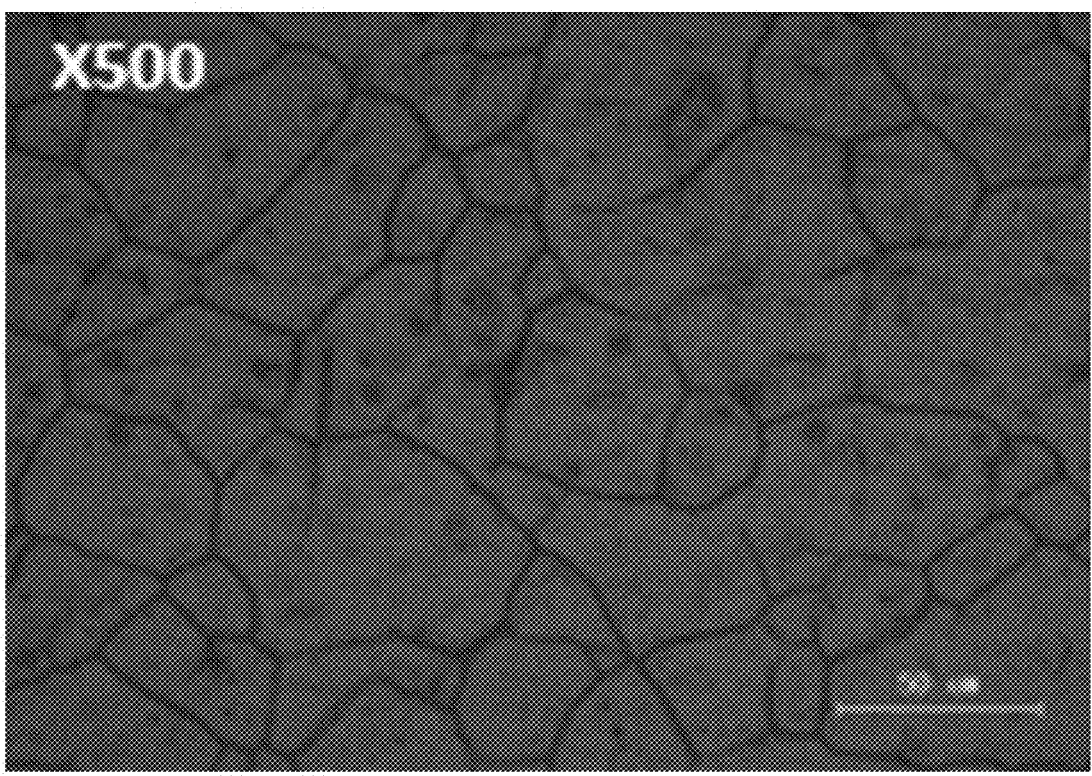
FIG. 4 is a microstructure photograph showing stainless steels according to Comparative Example 3.

FIG. 4 is a microstructure photograph shown the stainless steel according to Comparative Example 3. The stainless steel of Comparative Example 3 has the matrix structure of the austenite, which is 99% or more, and the matrix structure of the δ-ferrite, which is 1% or less, based on the grain size area thereof. The stainless steel of Comparative Example 3 has an average diameter (about 24 to 27 µm) corresponding to an ASTM grain size number of 7.5.

Figure 5:
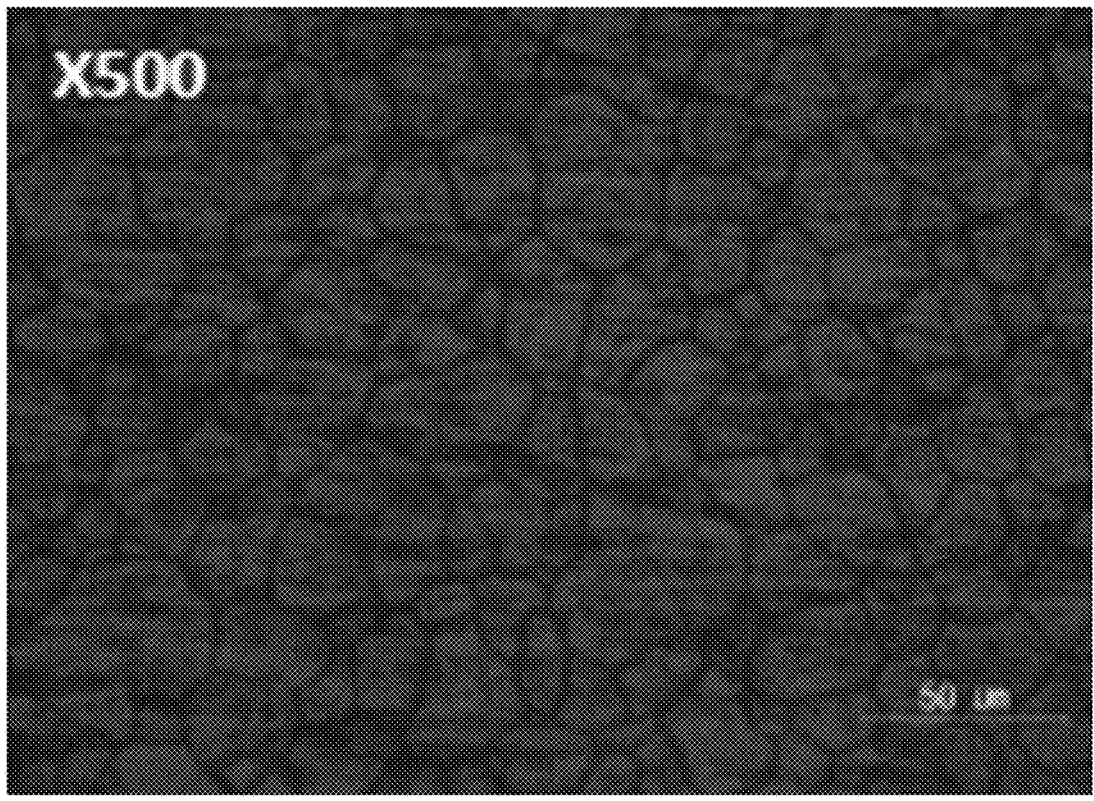
FIG. 5 is a microstructure photograph showing stainless steels according to Comparative Example 4.

FIG. 5 is a microstructure photograph shown the stainless steel according to Comparative Example 4. The stainless steel according to Comparative Example 4 has only the matrix structure of the austenite, and has an average diameter corresponding to the ASTM grain size number of 9.

Figure 6:
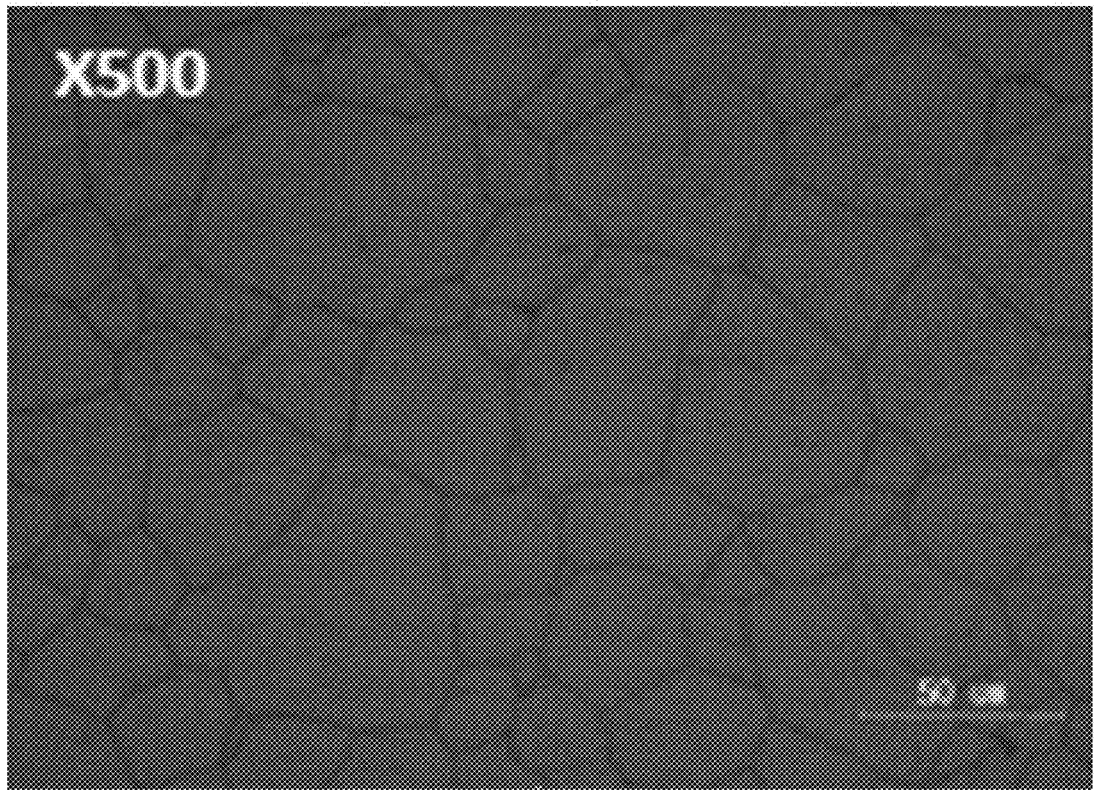
FIG. 6 is a microstructure photograph showing stainless steels according to Comparative Example 5.

FIG. 6 is a microstructure photograph showing the stainless steel according to Comparative Example 5. The stainless steel of Comparative Example 5 has only the matrix structure of the austenite, and has an average diameter corresponding to the ASTM grain size number of 7.5.

The stainless steel of Embodiment 3 has an average diameter (about 39 to 40 µm) corresponding to an ASTM grain size number of 6.5. It can be predicted that the microstructure photograph of the stainless steel according to Embodiment 3 will be substantially identical to similar to that of Embodiment 1 or Embodiment 2 shown in FIG. 2A or 2B (e.g., when the ASTM grain size number of Embodiment 1 or 2 is 6.5).

Figure 7:
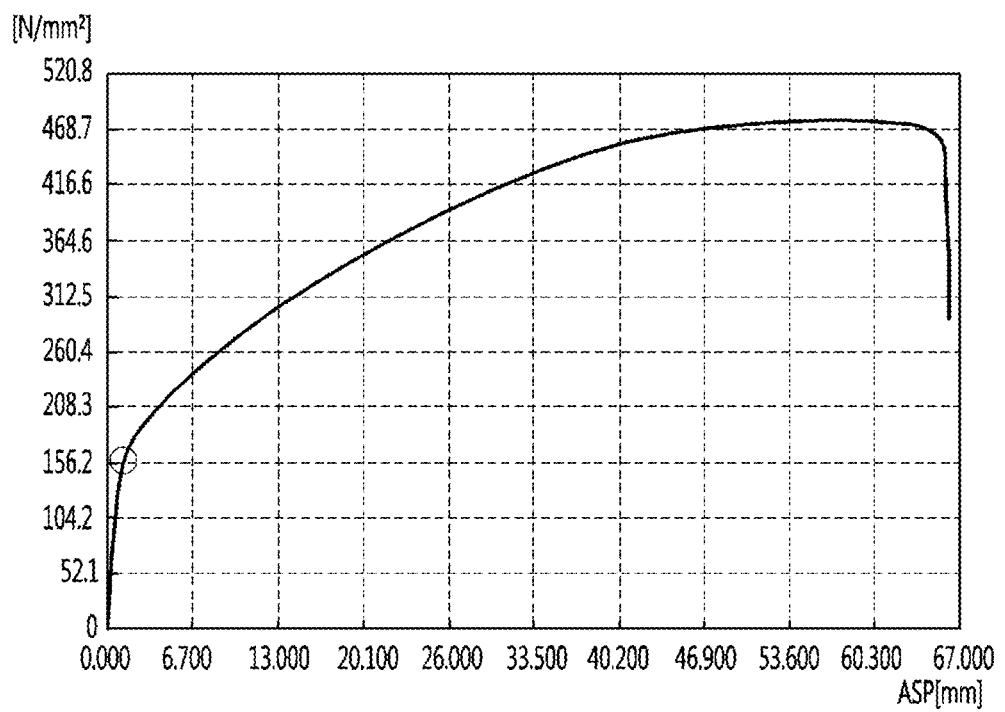
FIG. 7 is a stress-deformation rate graph obtained by evaluating properties of a stainless steel according to Embodiment 3 of the present disclosure.

FIG. 7 is a stress-deformation rate graph obtained by evaluating properties of the stainless steel according to Embodiment 3. The horizontal axis of the graph represents displacement (mm) of the stainless steel, and the vertical axis of the graph represents stress (N/mm$^2$) applied to the stainless steel.

As can be seen from the graph, the yield strength of the stainless steel was measured as about 156.2 MPa, and the tensile strength of the stainless steel was measured as about 470 MPa.

As results obtained by evaluating properties of the stainless steel of the present disclosure, it was measured that, although the composition, matrix structure, and average diameter were gradually changed from Embodiment 3, the stainless steel had a yield strength of about 160 MPa or less, a tensile strength of about 480 MPa or less, a hardness of about 120 Hv or less, and an elongation of 60% or more. In addition, it was measured that the stainless steel of the present disclosure had properties within the above-described range, regardless of the shape of the stainless steel, which was a tube or sheet.

Results obtained by comparing the stainless steel of the present disclosure with other Comparative Examples are shown in the following Table 2.

TABLE 2

| | Kinds | Mechanical | | | |
| --- | --- | --- | --- | --- | --- |
| | | Yield strength [MPa] | Tensile strength [MPa] | Hardness [Hv] | Elongation [%] |
| Comparative Example 1 | Copper (C1220T) pipe | 100 | 270 | 100 | 45 or more |
| Comparative Examples 2 to 5 | Stainless steel (grain size number: 7.5 or more) | 200 or so | 500 or so | 130 or so | 50 or more |
| Present disclosure | Stainless steel (grain size number: 5.0 to 7.0) | 160 or so | 480 or so | 120 or so | 60 or more |

Comparative Example 1 is a copper pipe, and the copper pipe has a yield strength of 100 MPa, a tensile strength of 270 MPa, a hardness of 100 Hv, and an elongation of 45% or more. Since the copper has properties of low strength and low hardness, the copper pipe is commercialized as a refrigerant pipe in an air conditioner, etc. However, as described above, the reliability of the copper is limited due to the occurrence of corrosion, and the copper pipe is inappropriate to be used as a pipe for a new refrigerant.

In addition, stainless steels of Comparative Example 2 to 5 have compositions and matrix structures, which are similar to those of the stainless steel of the present disclosure, and grain size numbers of the stainless steels are 7.5 or more. The stainless steels of Comparative Examples 2 to 5 have yield strengths of 200 MPa or so, tensile strengths of 500 MPa or so, hardnesses of 130 Hv or so, and elongations of 50% or more. The stainless steels of Comparative Examples 2 to 5, which have grain size numbers greater than 7.5, have properties of excessively high strength and excessively high hardness as compared with the copper. Therefore, although the stainless steels of Comparative Examples 2 to 5 can solve the problem of the copper due to the occurrence of corrosion, the stainless steels of Comparative Examples 2 to 5 have a problem in that the stainless steels are inappropriate to be processed as the refrigerant pipe.

On the other hand, the stainless steel of the present disclosure has a yield strength of about 160 MPa or so, a tensile strength of about 480 MPa or so, a hardness of about 120 Hv or so, and an elongation of 60% or more. Thus, the stainless steel of the present disclosure can solve not only the problem of processability, which occurs in the stainless steels of Comparative Examples 2 to 5 but also the problem of corrosion, which occurs in the copper of Comparative Example 1. Further, since the stainless steel of the present disclosure has a property of sufficiently high pressure resistance, the stainless steel of the present disclosure is appropriate to be used as a pipe for a new high-pressure refrigerant such as R32.

In addition, the thermal conductivity of the copper is 388 W/mK, and the thermal conductivity of the stainless steel is 16.2 W/mK. Since heat loss in flow of the refrigerant is increased as the thermal conductivity of a material is increased, the efficiency of a cycle is deteriorated as the thermal conductivity of the material is increased. The thermal conductivity of the stainless steel is merely about 4% of that of the copper. Thus, if a piper for the cycle is configured with the stainless steel, the heat loss can be reduced, thereby improving the efficiency of the cycle.

As described above, the stainless steel of the present disclosure has properties of low strength and low hardness to the same level as those of the copper material while having properties of high corrosion resistance and high pressure resistance, which are intrinsic properties of the stainless steel. Thus, the stainless steel of the present disclosure has sufficient conditions applicable to a pipe by solving the problem of processability.

Hereinafter, a pipe made of stainless steel, a system including the pipe, and the like will be described.

Figure 8:
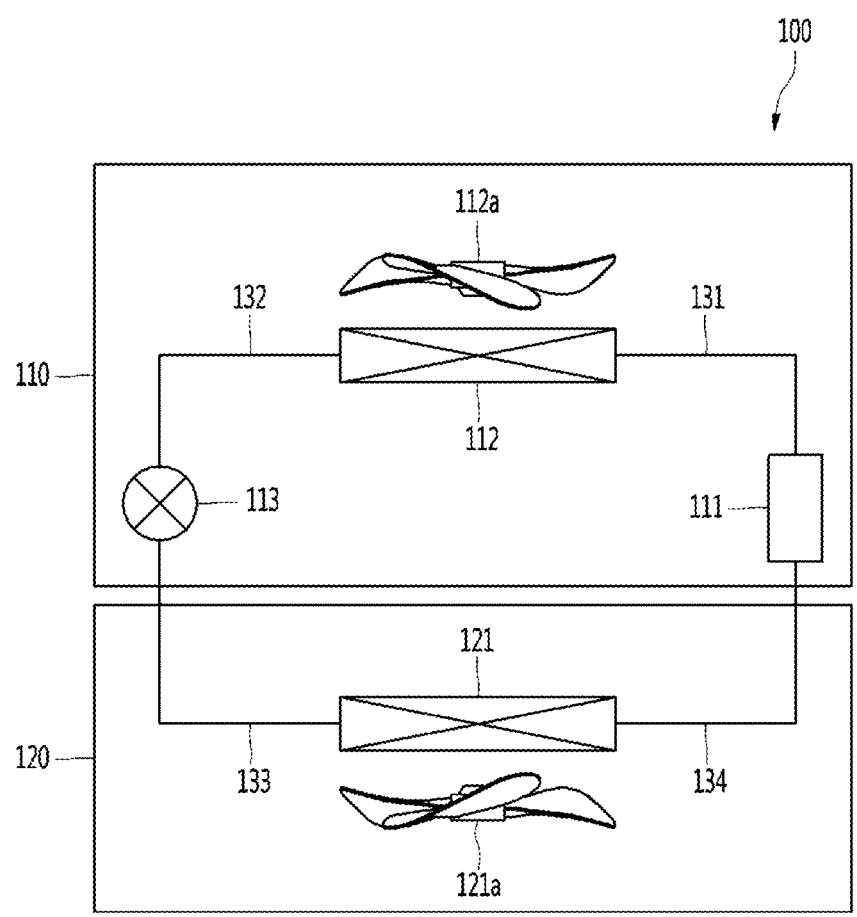
FIG. 8 is a main portion configuration view showing a refrigeration cycle of an air conditioner according to an embodiment of the present disclosure.

FIG. 8 is a main portion configuration view showing a refrigeration cycle of an air conditioner according to an embodiment of the present disclosure.

The air conditioner 100 is an example of a system including pipes 131, 132, 133, and 134 made of stainless steel, i.e., stainless pipes. Therefore, the system including the stainless pipes 131, 132, 133, and 134 is not necessarily limited to the air conditioner 100, and another type of system corresponding to the system described in the present disclosure as long as it includes the pipes 131, 132, 133, and 134 made of stainless steel.

The air conditioner 100 includes an outdoor unit 110 and an indoor unit 120. One or more indoor units 120 may be connected to one outdoor unit 110, and the outdoor unit 110 and the indoor unit(s) 120, which are connected as described above, may be operated as one system. In addition, the air conditioner 100 may be operated in only a cooling mode or a heating mode by selectively operating the refrigeration cycle in only one direction. Alternatively, the air conditioner 100 may be alternately operated in the cooling mode and the heating mode by selectively operating the refrigeration cycle in both directions through a four-way valve (not shown).

The outdoor unit 110 may be configured to include a compressor 111, an outdoor heat exchanger 112, and an expander 113.

The compressor 111 is configured to compress a refrigerant to a high-temperature and high-pressure gas. The compressor 111 may be operated by being supplied with power. In the present disclosure, the compressor is a concept that includes an engine operated by being supplied with fuel. Any compressor corresponds to the compressor 111 defined in the present disclosure as long as it constitutes the refrigeration cycle and compresses the refrigerant.

The outdoor heat exchanger 112 is configured to condense a gaseous refrigerant compressed to high temperature and high pressure in the compressor 111 to a high-pressure liquid by allowing the gaseous refrigerant to be heat-exchanged with outdoor air in a cooling operation. In addition, an outdoor fan 112a that allows heat exchange to be smoothly performed in the outdoor heat exchanger 112 is installed at one side of the outdoor heat exchanger 112. The outdoor fan 112a is formed to suck outdoor air and blow the sucked air toward the outdoor heat exchanger 112.

The expander 113 is configured to control an overheating degree in a cooling operation and an overcooling degree in a heating operation by adjusting the temperature of a refrigerant discharged from the outdoor heat exchanger 112.

In addition, the indoor unit 120 may be configured to include an indoor heat exchanger 121 and an indoor fan 121a. The indoor heat exchanger 121 is configured to convert a low-temperature and low-pressure refrigerant passing through the expander 131 into a low-temperature and low-pressure gas by evaporating the low-temperature and low-pressure refrigerant in the cooling operation. The indoor fan 121a circulates indoor air such that heat exchange is smoothly performed in the indoor heat exchanger.

The compressor 111, the outdoor heat exchanger 112, the expander 113, and the indoor heat exchanger 121 are sequentially connected by the pipes 131, 132, 133, and 134. The compressor 111, the outdoor heat exchanger 112, the expander 113, and the indoor heat exchanger 121, which are sequentially connected by the pipes 131, 132, 133, and 134, form the refrigeration cycle. Since a refrigerant flows along the pipes 131, 132, 133, and 134, the pipes 131, 132, 133, and 134 form a flow path of the refrigerant. In addition, since heat exchange is performed in the outdoor heat exchanger 112 and the indoor heat exchanger 121 while the refrigerant is flowing along the flow path, the outdoor heat exchanger 112 and the indoor heat exchanger 121 also form a flow path of the refrigerant. The above-described stainless steel of the present disclosure is applicable as a material of the pipes 131, 132, 133, and 134, and is also applicable as a flow path of the outdoor heat exchanger 112 or the indoor heat exchanger 121.

In the refrigeration cycle of FIG. 8, the indoor heat exchanger 121 is installed at an upstream side of the compressor 111, and the outdoor heat exchanger 112 is installed at a downstream side of the compressor 111. Here, the concepts "upstream side" and "downstream side" are set based on flow of the refrigerant in the cooling mode.

A valve, an accumulator, or the like may be additionally installed between the compressor 111 and the indoor heat exchanger 121, and a valve, a muffler, or the like may be additionally installed between the compressor 111 and the outdoor heat exchanger 112. The valve is used to control the flow of refrigerant, and the accumulator is used to prevent a phenomenon that the efficiency of the refrigeration cycle is deteriorated as a liquid refrigerant that has not yet been evaporated is introduced into the compressor 111. In addition, the muffler is used to reduce noise generated in a discharge flow path of the compressor 111.

In the present disclosure, a device that is directly connected to the compressor 111 by a pipe and forms any part of the refrigeration cycle together with the compressor 111 among devices constituting the refrigeration cycle is designated as a refrigeration cycle component. For example, in FIG. 8, each of the indoor heat exchanger 121 and the outdoor heat exchanger 112 is directly connected to the compressor 111 by a pipe, and hence corresponds to the refrigeration cycle component. When a valve or an accumulator is installed between the compressor 111 and the indoor heat exchanger 121, the valve or the accumulator corresponds to the refrigeration cycle component. Similarly, when a valve or a muffler is installed between the compressor 111 and the outdoor heat exchanger 112, the valve or the muffler corresponds to the refrigeration cycle component.

The refrigeration cycle component forms a part of the refrigeration cycle together with the compressor 111. The refrigeration cycle component is installed at at least one of an upstream side and a downstream side of the compressor 111, based on the flow of the refrigerant. The refrigerant cycle component installed at the upstream side of the compressor 111 is configured to supply a refrigerant to the compressor 111, and the refrigeration cycle component is configured to be supplied with a refrigerant from the compressor 111.

Figure 9:
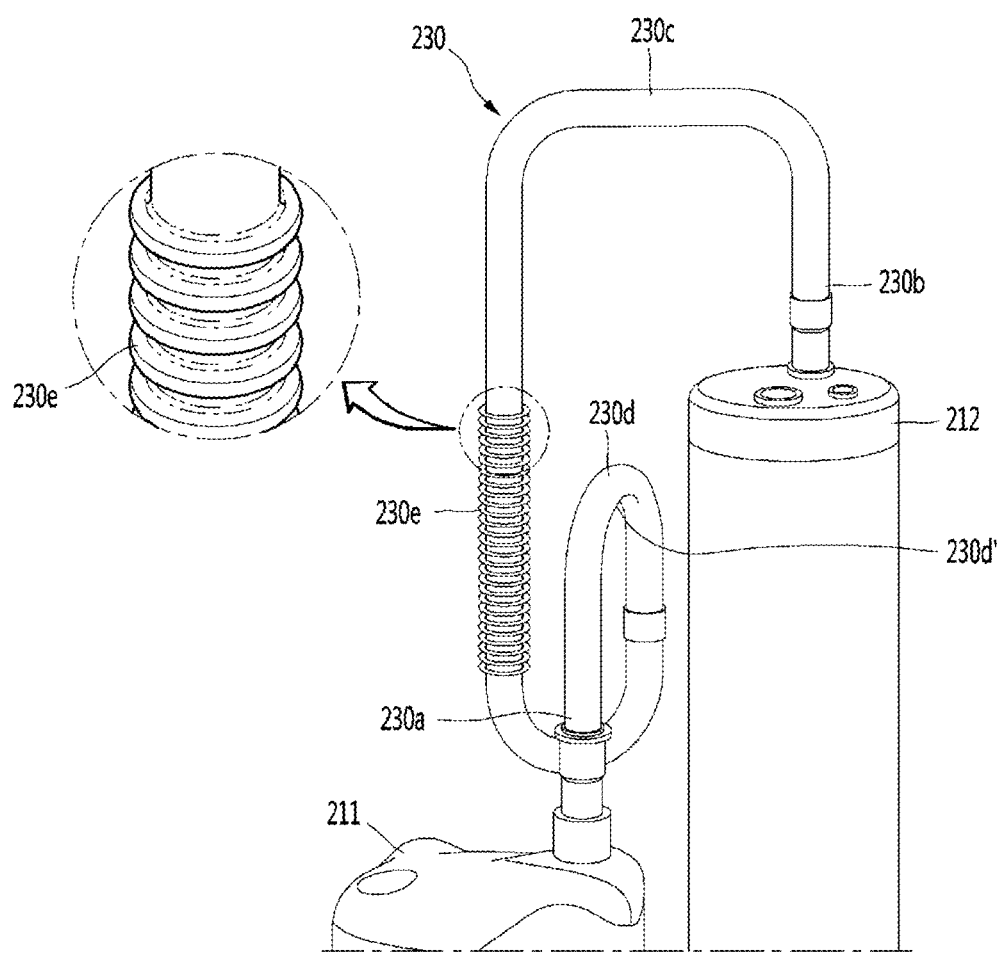
FIG. 9 is a conceptual view partially showing an air conditioner according to the present disclosure.

FIG. 9 is a conceptual view partially showing an air conditioner according to the present disclosure.

A compressor 211 and an accumulator 212 are illustrated in FIG. 9. The compressor 211 has already been described in FIG. 8. The accumulator 212 corresponds to an example of the refrigeration cycle component. The refrigeration cycle component has been described as any one device of the refrigeration cycle component, which is directly connected to the compressor 211 by a pipe. To be directly connected to the compressor 211 means that any component except the pipe does not exist between the compressor 211 and the refrigeration cycle component.

The accumulator 212 is used to prevent a liquid refrigerant that has not yet been evaporated in an evaporator (corresponding to the indoor heat exchanger described in FIG. 8) from being introduced into the compressor 211. Here, it is illustrated that the accumulator 212 is an example of the refrigeration cycle component, but the other description except the essential structure and function of the accumulator 212 may be applied to all other refrigeration cycle components.

In the present disclosure, the pipe that connects the compressor 211 and the accumulator 212 is made of a stainless material. Since the accumulator 212 is an example of the refrigeration cycle component, the pipe that connects the compressor 211 and the refrigeration cycle component is made of a stainless material. Therefore, the pipe may be designated as a stainless pipe 230.

The stainless pipe 230 has a high resistance against corrosion as compared with conventional copper pipes and hence has a long lifespan as compared with the copper pipes. Also, the stainless pipe 230 has a high strength as compared with the copper pipes.

One end 230a of the stainless pipe 230 is connected to the compressor 211 and the other end 230b of the stainless pipe 230 is connected to the accumulator 212 such that the stainless pipe 230 is formed as a single pipe between the compressor 211 and the accumulator 212. The single pipe means that it is formed as one pipe. The single pipe is to be distinguished from one formed by assembling several parts.

In order for the stainless pipe 230 to be formed as a single pipe, the one end 230a of the stainless pipe 230 is to be connected to the compressor 211, and the other end 230b of the stainless pipe 230 is to be connected to the accumulator 212. If the other end 230b of the stainless pipe 230 is connected to another pipe instead of the accumulator 212, this means that the stainless pipe 230 is not the single pipe.

The stainless pipe 230 partially has a corrugated part 230e to attenuate vibration transferred from the compressor 211 to the accumulator 212. In the compressor 211, vibration is essentially generated in a process of compressing a refrigerant, and vibration transferred along a mechanical part are mainly transferred along a flat surface. Thus, if the stainless pipe 230 has the corrugated part 230e formed as ridges 230e1 and valleys 230e2 are repeatedly alternatively disposed, a flat surface (i.e., an outer circumferential surface of the stainless pipe) is changed into an uneven surface, and hence it is possible to attenuate the vibration transferred from the compressor 211 to the accumulator 212.

The corrugated part 230e is formed as at least a portion of the stainless pipe 230 is processed and then integrally formed with the other part of the stainless pipe 230. The corrugated part 230e may be formed through a hydro-forming process. The hydro-forming process is not a process of separately processing various types of unit parts using a press and then welding the unit parts, but refers to a process of forming the corrugated part 230e while contracting the length of a linear pipe by applying a strong water pressure to the linear pipe. If the corrugated part 230e is formed through the hydro-forming process, the corrugated part 230e becomes a portion of the stainless pipe 230, and is integrally formed with the other part of the stainless pipe 230.

Like the corrugated part 230e, the stainless pipe 230 may include a bent region 230d to attenuate vibration. The bent region 230d refers to a region except linear regions in the stainless pipe 230. The bent region 230d may be formed as at least a portion of the stainless pipe 230 is bent. As the number of bent regions 230d is increased, the structure of the stainless pipe 230 is complicated, but vibration transferred from the compressor 211 to the accumulator 212 can be attenuated.

The corrugated part 230 may be formed in a linear region 230c of the stainless pipe 230, be formed in the bent region 230d, and be formed in both of the linear region 230c and the bent region 230d. In addition, the corrugated part 230e may be formed throughout the linear region 230c and the bent region 230d of the stainless pipe 230.

In the conventional flexible pipe, it is difficult to form a corrugated part in a bent region. However, in the stainless pipe 230 of the present disclosure, as the corrugated part 230e is integrally formed with the other part of the stainless pipe 230, the stainless pipe 230 can have the corrugated part 230e regardless of positions. In particular, if the corrugated part 230e is formed in the bent region 230d, noise may be slightly generated. However, the corrugated part 230e of the present disclosure has a structure in which ridges and valleys are densely disposed as will be described later, and thus a pressure drop of the refrigerant, which occurs as the corrugated part 230e is formed in the bent region 230d, is very limited as compared with the conventional flexible pipe.

When the stainless pipe 230 having both of the corrugated part 230e and the bent region 230d is to be manufactured, the corrugated part 230e is first formed at a linear pipe through the hydro-forming process, and then performs plastic processing such that the linear pipe is bent by an external force.

As the corrugated part 230e is integrally formed with the other part of the stainless pipe 230, a junction part may be removed from the pipe that connects the compressor 211 and the accumulator 212 to each other. That the junction exists means that a discontinuous part exists in the pipe, and stresses are accumulatively concentrated at the discontinuous part. Therefore, the junction part may become a source point at which a rupture occurs, which results in deterioration of the durability and mechanical reliability of the pipe.

However, the stainless pipe 230 of the present disclosure does not have any separated joint part, unlike the conventional flexible pipe, and hence any discontinuous part does not exist between the compressor 211 and the accumulator 212. Thus, the stainless pipe 230 of the present disclosure is configured to prevent stresses from being concentrated on only any partial region.

Figure 10:
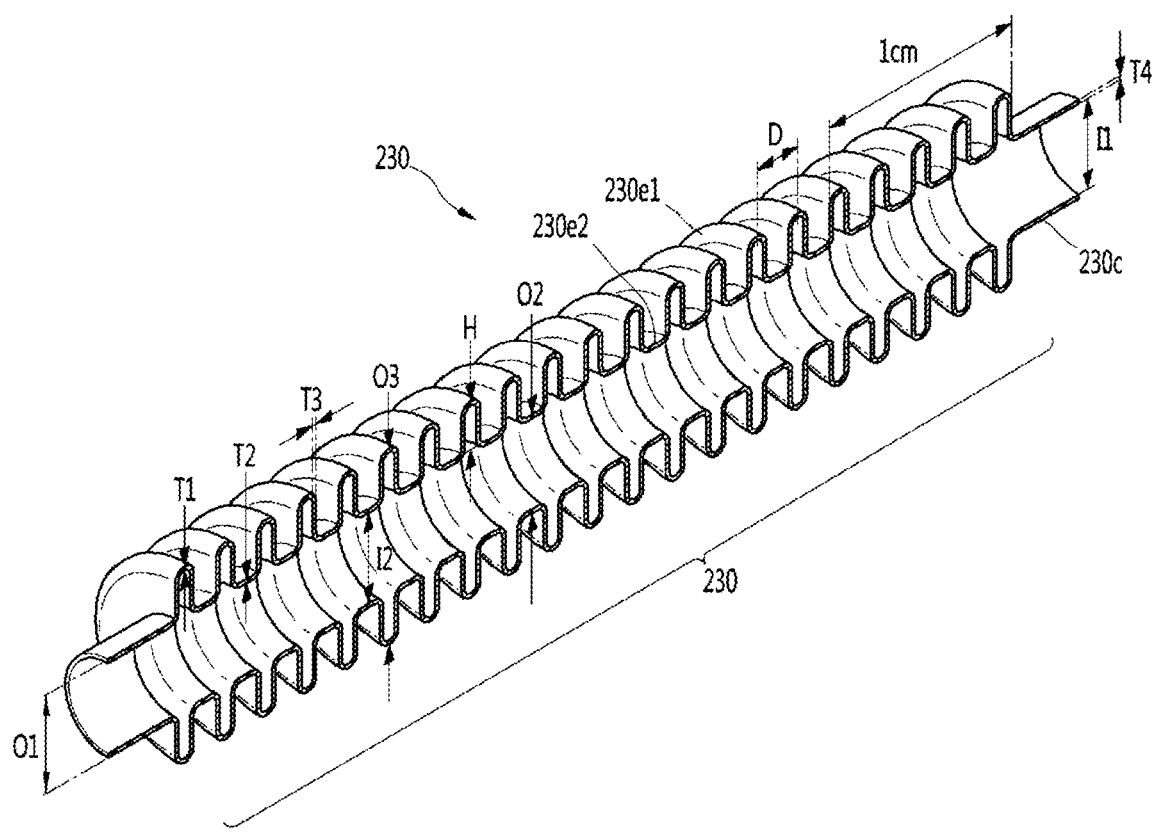
FIG. 10 is a sectional view partially showing a corrugated part of a stainless pipe shown in FIG. 9.

FIG. 10 is a sectional view partially showing the corrugated part 230e of the stainless pipe 230 shown in FIG. 9.

The corrugated part 230e is formed as ridges 230e1 and valleys 230e2 are repeatedly alternately disposed. That the ridges 230e1 and the valleys 230e2 are alternately disposed means that the ridge 230e1, the valley 230e2, the ridge 230e1, the valley 230e2, the ridge 230e1, and the valley 230e2 are disposed in turn.

In the stainless pipe 230 of the present disclosure, the ridges 230e1 are spaced apart from each other, and the valleys 230e2 are spaced apart from each other. In other words, the corrugated part 230e comprises individual or separate ridges 230e1 and valleys 230e2 alternately arranged. This is to be distinguished from a structure in which each of the ridge 230e1 and the valley 230e2 is formed in a spiral shape. If each of the ridge 230e1 and the valley 230e2 is formed in the spiral shape, this does not mean that the ridges 230e1 are spaced apart from each other and the valleys 230e2 are spaced apart from each other.

If the stainless pipe 230 has a structure in which the ridges 230e1 are spaced apart from each other and the valleys 230e2 are spaced apart from each other, a bent region can be formed by a relatively small external force, and it is possible to reduce the occurrence of a pressure drop and the generation of noise.

If the ridges 230e1 and the valleys 230e2 have the structure of the present disclosure, the pipe can be bent by applying a relatively small external force when a bent region is formed by applying an external force to the linear region in which the corrugated part 230e is formed. This is because the ridges 230e1 protrude along a flat surface perpendicular to the length direction of the stainless pipe 230. For example, the outermost circumference of the ridge 230e1 is perpendicular to the length direction of the stainless pipe 230. Alternatively, this is because the ridges 230e1 protrude in a direction perpendicular to the outer circumferential surface of the stainless pipe 230.

Accordingly, at one side of the stainless pipe 230, the ridge 230e1 and the ridge 230e1 may be bent as they are distant from each other. At the other side of the stainless pipe 230, the ridge 230e1 and the ridge 230e1 may be bent as they are close to each other. When external forces are applied using both hands, the ridges 230e1 and the valleys 230e2 do not interfere with bending of the stainless pipe 230.

In this case, the one side of the stainless pipe 230 indicates a portion designated by 230d of FIG. 9, and the other side of the stainless pipe 230 indicates a portion designated by 230d' of FIG. 9. In FIG. 9, the corrugated part 230e is not shown at the portion designated by 230d and the portion designated by 230d'. However, the stainless pipe 230 can be bent by applying a relatively small external force under the assumption that the corrugated part 230e is formed.

Unlike the present disclosure, in the structure in which each of the ridge and the valley is formed in the spiral shape, the ridge and the valley obliquely cross a direction in which external forces are applied using both hands, and hence interfere with bending of the pipe. For example, when external forces are applied using both hands in a state in which a pipe is held by both the hands, the direction in which the external forces are applied means a direction in which the external forces are gathered from the left and right to the middle. The ridge and the valley do not perpendicularly cross the direction, but obliquely cross the direction while forming an acute or obtuse angle. Accordingly, the ridge and the valley, which have a spiral structure, interfere with bending of the pipe, and the pipe is bent only when a relatively large external force is applied.

Meanwhile, the pressure of a refrigerant flowing in a pipe is influenced by roughness of the inner circumferential surface of the pipe. As the inner circumferential surface becomes rougher, a larger number of factors that resist the flow of refrigerant exist. Therefore, a pressure drop of the refrigerant is increased, and vibration or noise is increased due to an increase in resistance of a flow path. On the other hand, as the inner circumferential surface is formed similar to a smooth surface, the pressure drop of the refrigerant is decreased, and vibration or noise is decreased.

That the section of the inside of the pipe does not maintain an accurate circle means that a large number of factors that resist the flow of the refrigerant exist. If a large number of factors that resist the flow of the refrigerant exist, a pressure drop of the refrigerant passing through the pipe occurs, and noise is generated.

Therefore, in order to reduce the occurrence of a pressure drop of the refrigerant and the generation of noise, the section of the inside of the pipe is to maintain the accurate circle. Whether the section of the inside of the pipe is to maintain the accurate circle may be evaluated using out-of-roundness. The out-of-roundness refers to a size out of a geometrically accurate circle, and means a measurement value indicating how much all points located at the same distance from the center are out of the accurate circle.

In the present disclosure, if the ridges 230e1 are spaced part from each other and the valleys 230e2 are spaced apart from each other, a change in out-of-roundness can be prevented even when a bent region is formed by applying an external force to the linear region in the corrugated part 230e is formed. Thus, a change in out-of-roundness is relatively small at the inner circumferential surface of the corrugated part 230e formed in the bent region.

On the other hand, if the ridge and the valley are formed in the spiral shape, it is difficult to prevent a change in out-of-roundness even when a bent region is formed by applying an external force to the linear region in the corrugated part is formed. Therefore, a change in out-of-roundness is relatively large at the inner circumferential surface of the corrugated part formed in the bent region.

That the change in out-of-roundness is relatively small means that the section of the inside of the pipe has the shape of a more accurate circle. Hence, the corrugated part 230e of the present disclosure can reduce the occurrence of a pressure drop of the refrigerant and the generation of noise in the bent region.

In the stainless pipe 230 of the present disclosure, 2 to 5 ridges 230e1 are formed for each length of 1 cm along the length direction of the stainless pipe 230. Since the valley 230e2 is formed between the ridge 230e1 and the ridge 230e1, 1 to 4 valleys 230e2 are formed when 2 to 5 ridges 230e1 are formed for each length of 1 cm. As shown in FIG. 10, the distance of 1 cm is measured starting at the footage of one ridge, i.e. at the transition between a valley and a ridge.

That 2 to 5 ridges 230e1 are formed for each length of 1 cm means that the ridges 230e1 and the valleys 230e2 of the corrugated part 230e are very densely formed. If the ridges 230e1 and the valleys 230e2 are densely formed as described above, the inner circumferential surface of the corrugated part 230e is formed similar to the smooth surface, and thus a pressure drop of the refrigerant passing through the stainless pipe 230 can be reduced. Further, if the ridges 230e1 and the valleys 230e2 are densely formed, the flexibility of the stainless pipe 230 is increased, and thus the transfer of vibration and noise can be considerably attenuated.

It is difficult to manufacture a pipe having a structure in which ridges 230e1 having a number larger than 5 are formed in the length of 1 cm. In addition, when a bent region is formed by applying an external force to the linear region in which the corrugated part 230e is formed, the ridge 230e1 and the ridge 230e1 are adhered closely to each other, which acts as resistance. On the contrary, a pipe having a structure in which ridges 230e1 having a number smaller than 2 are formed in the length of 1 cm does not sufficiently reduce an external force required when a bent region is formed by applying the external force to the linear region in which the corrugated part 230e is formed. In addition, vibration is not sufficiently attenuated, and therefore, it is difficult to sufficiently reduce stress.

A distance D, i.e., the pitch, between the ridge 230e1 and the ridge 230e1 is to be 8 mm or less such that two or more ridges 230e1 exist in the length of 1 cm when the thickness of the corrugated part 230e is considered. This is because, if the distance D between the ridge 230e1 and the ridge 230e1 exceeds 8 mm, only one ridge 230e1 may exist in the length of 1 cm due to the thickness of the stainless pipe 230. As shown in FIG. 10, the distance D is measured from the center of the tip of one ridge to the center of the tip of the neighboring ridge.

Referring to FIG. 10, a thickness of the stainless pipe 230 at the ridge 230e1 is designated by T1. A thickness of the stainless pipe 230 at the valley 230e2 is designated by T2. A thickness of the stainless steel 230 between the ridge 230e1 and the valley 230e2 is designated by T3. In addition, a thickness of the stainless steel 230 in a region in which the corrugated part 230e does not exist is designated by T4. Here, the thickness refers to a difference between the external diameter and the internal diameter of the stainless pipe 230. The T4 may be changed depending on a design, but may have a sufficient hardness even when the T4 is 0.5 to 0.8 mm because of the properties of the stainless material.

The thicknesses T1, T2, T3, i.e. the wall thicknesses of the stainless pipe, of the corrugated part 230e and the wall thickness T4 in the region in which the corrugated part 230e does not exist have thickness differences of exceeding 0 to 5% or less. For example, if the thickness of the corrugated part 230e is t, the region in which the corrugated part 230e does not exist has a thickness of 0.95 t to 1t. In the process of forming the corrugated part 230e, as the length of the stainless pipe 230 is decreased through the hydro-forming process, the thickness of the stainless pipe 230 may be decreased. However, that the thickness difference is 5% or less means that the thickness of the corrugated part 230e and the thickness in the region in which the corrugated part 230e does not exist are almost constant. That the thickness is almost constant means that the factor acting as resistance hardly exists. Thus, the generation of noise and the occurrence of a pressure drop can be prevented in the stainless pipe 230.

If the thickness of the corrugated part 230e has almost equal to that of the other part of the stainless pipe 230, the strength of the corrugated part 230e can be sufficiently ensured. Thus, in the stainless pipe 230 of the present disclosure, if the wire braid that has been described in "BACKGROUND" is not required, a junction part for joining the wire braid is not also required. Since the junction part is a type of discontinuous part, the stainless pipe 230 that does not require the wire braid is a component capable of preventing the concentration of stresses.

In addition, the T1, T2, and T3 have thickness differences of exceeding 0 to 2% or less. This means that a thickness at each position of the corrugated part 230e is almost constant. If the thickness at each position of the corrugated part 230e is almost constant, resistance formed at the inner circumferential surface of the corrugated part 230e is reduced. Accordingly, the pressure drop of the refrigerant can be reduced, and the efficiency of the refrigeration cycle can also be improved. Furthermore, the transfer of vibration and noise can be attenuated.

The reason why the T1 to T4 have an almost constant thickness is that the corrugated part 230e is integrally formed with the other part of the stainless pipe 230.

Meanwhile, it can be predicted that the other part of the stainless pipe 230 except the corrugated part 230e will have the same external diameter and internal diameter as the linear region in which the corrugated part 230e does not exist or the bent region in which the corrugated part 230e does not exist. However, the external diameter and internal diameter of the corrugated part 230e may not be equal to those of the other part of the stainless pipe 230. This is because the corrugated part 230e is formed by processing the linear region.

An external diameter of the other part of the stainless pipe 230 except the corrugated part 230e may be designated by O1, and an internal diameter of the other part of the stainless pipe 230 may be designated by I1. An external diameter at the valley 230e2 may be designated by O2, and an internal diameter at the valley 230e2 may be designated by I2. In addition, an external diameter at the ridge 230e1 may be designated by O3. A difference between the external diameter O3 at the ridge 230e1 and the external diameter O2 at the valley 230e2 may be designated by H (H=O3−O2). Here, the H denotes a height of the ridge 230e1. In other words, the distance H is the difference between the outer radius of the ridge and the outer radius of the valley.

In the present disclosure, the O1 and O2 have a size difference of exceeding 0 to 2% or less. In addition, the I1 and I2 also have a size difference of exceeding 0 to 2% or less. This means that an external diameter before the corrugated part 230e is formed is not substantially different from that at the valleys after the corrugated part 230e is formed and an internal diameter before the corrugated part 230e is formed is not substantially different from that at the valleys after the corrugated part 230e is formed.

In addition, the external diameter at the ridge 230e1 may be appropriately designed according to the external diameter of the stainless pipe 230. Appropriate external diameters at the ridge 230e1 are shown in the following Table 3. The unit of all numerical values shown in Table 3 is mm.

TABLE 3

| External diameter (O1) | Internal diameter (I1) | External (O3) diameter of ridge | Height (H) of ridge |
|---|---|---|---|
| 15.88 | 14.6 | 21.48-22.28 | 2.8-3.2 |
| 18.2 | 17 | 23.8-24.6 | 2.8-3.2 |
| 19.05 | 17.8 | 24.65-25.45 | 2.8-3.2 |
| 20 | 18.8 | 25.6-26.4 | 2.8-3.2 |
| 26 | 24.4 | 31.6-32.4 | 2.8-3.2 |
| 30 | 28.8 | 35.6-36.4 | 2.8-3.2 |
| 30.8 | 29.6 | 36.4-37.2 | 2.8-3.2 |
| 33 | 32 | 38.6-39.4 | 2.8-3.2 |
| 35 | 33.8 | 40.6-41.4 | 2.8-3.2 |
| 39 | 37.8 | 44.6-45.4 | 2.8-3.2 |
| 50.8 | 49.6 | 56.4-57.2 | 2.8-3.2 |

A height H of the ridge 230e1 is derived by dividing in half a value obtained by subtracting the external diameter O1 in the region in which the corrugated part 230e does not exist from the external diameter O3 of the ridge 230e1. Referring to Table 3, the external diameter O3 of the ridge 230e1 is designed to have a range in which the height H of the ridge 230e1 can exist within a range of 2.8 to 3.2 mm. This is because, if the height H of the ridge 230e1 is lower than 2.8 mm, stress is minutely reduced. In addition, this is because, if the height H of the ridge 230e1 is higher than 3.2 mm, it is highly likely that the stainless pipe 230 will be damaged.

Figure 11A:
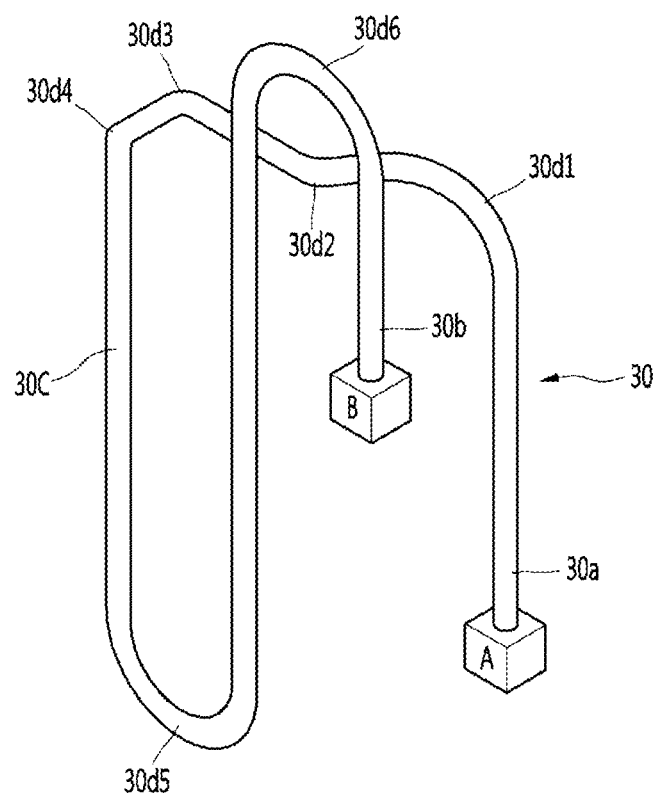
FIG. 11A is a conceptual view showing a state in which two components of the refrigeration cycle are connected to each other using a conventional pipe having no corrugated part.

FIG. 11A is a conceptual view showing a state in which two components of the refrigeration cycle are connected to each other using the conventional pipe having no corrugated part.

A and B denote arbitrary components that constitute the refrigeration cycle, respectively. The A and B are disposed in a three-dimensional space to be spaced apart from each other, and are connected to each other by a pipe 30. One end 30a of the pipe 30 is connected to the A, and the other end 30b of the pipe 30 is connected to the B. Like the compressor, vibration and noise may be generated from at least one of the A and B.

The pipe 30 has a plurality of bent regions 30d1, 30d2, 30d3, 30d4, 30d5, and 30d6 to prevent vibration from being transferred from any one to another one. The vibration is transferred through the pipe 30. In particular, a vibration transfer rate in a linear region 30c is high as compared with the bent regions 30d1, 30d2, 30d3, 30d4, 30d5, and 30d6. On the contrary, the transfer of vibration is reduced in the bent regions 30d1, 30d2, 30d3, 30d4, 30d5, and 30d6.

Therefore, in order to prevent the transfer of vibration, the pipe 30 is to have the plurality of bent regions 30d1, 30d2, 30d3, 30d4, 30d5, and 30d6 as shown in FIG. 11A. However, in the above-described structure, although the transfer of vibration is reduced, a wide installation space of the pipe is required, and the structure of the pipe is excessively complicated.

Figure 11B:
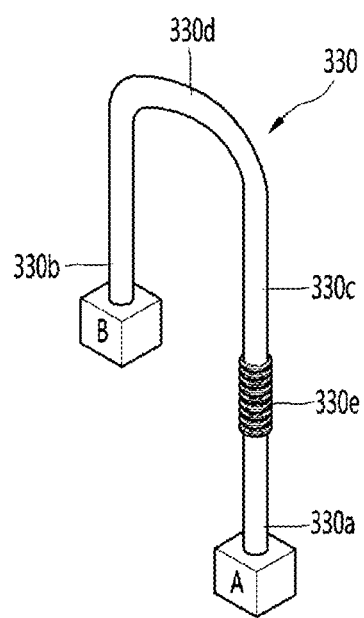
FIG. 11B is a conceptual view showing a state in which two components of the refrigeration cycle are connected to each other using a stainless pipe of the present disclosure, which has a corrugated part.

FIG. 11B is a conceptual view showing a state in which two components of the refrigeration cycle are connected to each other using a stainless pipe 330 of the present disclosure, which has a corrugated part 330e. Like FIG. 11A, A and B denotes two components of the refrigeration cycle, respectively, and installation positions of the A and B in a three-dimensional space are the same as those shown in FIG. 11A.

It has already been described above that the corrugated part 230e can attenuate vibration. Thus, when the A and B are connected by the stainless pipe 330 having the corrugated part 330e, vibration can be more effectively attenuated even though the stainless pipe 330 having a relatively simplified structure as compared with FIG. 11A. Accordingly, if the stainless pipe 330 having the corrugated part 330e is used, the A and B can be connected to each other even in a relatively narrow installation space. For example, although a relatively small number of bent regions 330d exist, vibration can be more effectively attenuated by the corrugated part 330e.

In FIG. 11b, undescribed reference numerals 330a and 330b represent both ends of the stainless pipe 330, respectively. In addition, undescribed reference numeral 330c represents a linear region, and undescribed reference numeral 330d represents a bent region.

Figure 12:
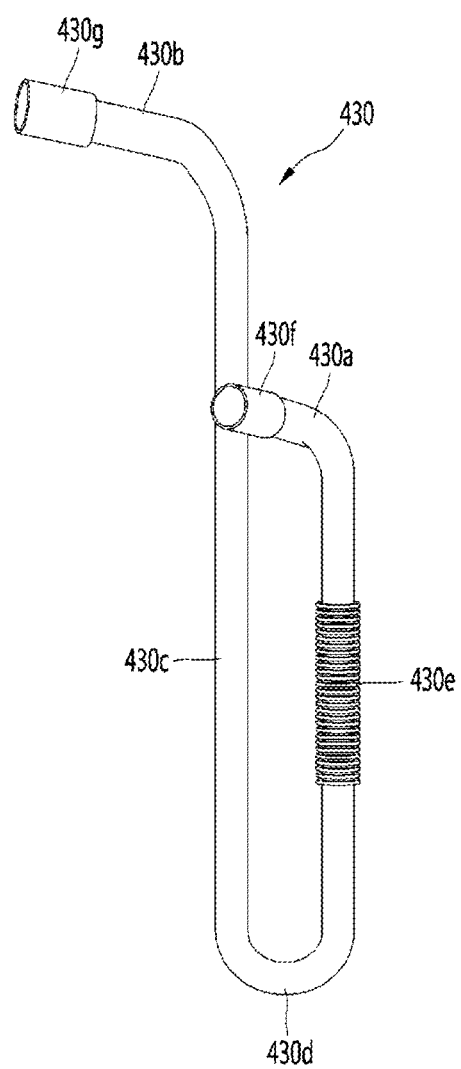
FIG. 12 is a conceptual view showing a stainless pipe according to another embodiment of the present disclosure.

FIG. 12 is a conceptual view showing a stainless pipe 430 according to another embodiment of the present disclosure.

The stainless pipe 430 may have a copper junction part 430f or 430g at at least one of both ends 430a and 430b thereof. The copper junction part 430f or 430g is made of copper having the shape of a relatively short linear pipe, and is joined to an outer circumferential surface or inner circumferential surface of the stainless pipe 430.

When the copper junction part 430f or 430g is joined to the outer circumferential surface of the stainless pipe 430, the copper junction part 430f or 430g has a size surrounding the stainless pipe 430. On the contrary, when the copper junction part 430f or 430g is joined to the inner circumferential surface of the stainless pipe 430, the stainless pipe 430 has a size surrounding the copper junction part 430f or 430g.

A pipe that connects the compressor and the refrigeration cycle component to each other is connected to a pipe connection part (not shown) of the compressor and a pipe connection part (not shown) of the refrigeration cycle component. The pipe connection part refers to a part that is provided to the compressor or the refrigeration cycle component, to be joined with the stainless pipe 430. The pipe connection part has the shape of a pipe, and may protrude to the outside from the compressor or the refrigeration cycle component to be connected to the stainless pipe 430.

Joining of different kinds of materials with each other is difficult as compared with joining of the same kind of materials with each other. Since the pipe connection part is generally made of a copper material, it may be difficult to directly join the stainless pipe 430 with the pipe connection part.

In order to solve such a difficulty, the stainless pipe 430 of the present disclosure has the copper junction part 430f or 430g at at least one end thereof. Since the copper junction part 430f or 430g is made of the same kind of material as the pipe connection part, the stainless pipe 430 can be more easily joined with the pipe connection part as the copper junction part 430f or 430g.

The air conditioner described above is not limited to the configurations and methods of the above-described embodiments, and all or some of the embodiments may be selectively combined to achieve various modifications.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A refrigeration circuit comprising:
   a compressor to compress a refrigerant;
   a refrigeration cycle component disposed at and communicably coupled to at least one of an upstream side and a downstream side of the compressor, the refrigeration cycle component comprising a heat exchanger and a valve; and
   a stainless steel pipe having a first end thereof coupled to the compressor and a second end thereof coupled to one of the heat exchanger and the valve, the stainless steel pipe forming a single pipe between the compressor and the one of the heat exchanger and the valve, the stainless steel pipe having a corrugated part to attenuate vibration transferred from the compressor to the one of the heat exchanger and the valve,
   wherein at least a portion of the stainless steel pipe comprises the corrugated part, the corrugated part of the stainless steel pipe being integrally formed with a remaining portion of the stainless steel pipe,
   wherein the stainless steel is composed of, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, N: 0.03% or less, and a balance: residue: Fe, and incidental impurities, and
   wherein the stainless steel has an austenite matrix structure and an average diameter of 30 to 60 μm.

2. The refrigeration circuit of claim 1, wherein the corrugated part is thinner than a region of the stainless steel pipe in which the corrugated part does not exist, the corrugated part having a thickness that is less than or equal to 5% of the thickness of the region of the stainless steel pipe in which the corrugated part does not exist.

3. The refrigeration circuit of claim 1, wherein the corrugated comprises a plurality ridges and valleys that are alternately disposed,
wherein a thickness (T1) of the stainless steel pipe at each of the plurality of ridges, a thickness (T2) of the stainless steel pipe at each of the plurality of valleys, and a thickness (T3) of the stainless steel pipe between each of the alternatively disposed plurality of ridges and valleys have differences of exceeding 0 to 2% or less.

4. The refrigeration circuit of claim 1, wherein the corrugated part comprises a plurality of ridges and valleys that are alternately disposed,
wherein the plurality of ridges comprise 2 to 5 ridges that each have a length of 1 cm in a length direction of the stainless steel pipe.

5. The refrigeration circuit of claim 1, wherein the corrugated part comprises a plurality of ridges and valleys that are alternately disposed,
wherein a distance D between two adjacent ridges is 8 mm or less.

6. The refrigeration circuit of claim 1, wherein the stainless steel pipe includes a bent region at which at least a partial region of the stainless steel pipe is bent,
wherein the bent region comprises at least a portion of the corrugated part.

7. The refrigeration circuit of claim 1, wherein the stainless steel pipe comprises:
a linear region; and
a bent region at which at least a partial region of the stainless steel pipe is bent,
wherein the linear region and the bent region each comprises at least a portion of the corrugated part.

8. The refrigeration circuit of claim 1, wherein the corrugated part comprises a plurality of ridges and valleys that are alternately disposed,
wherein the plurality of ridges are spaced apart from each other, and the plurality of valleys are spaced apart from each other.

9. The refrigeration circuit of claim 1, wherein the corrugated part comprises a plurality of ridges and valleys that are alternately disposed,
wherein each of the ridges protrudes in a direction perpendicular to an outer circumferential surface of the stainless steel pipe.

10. The refrigeration circuit of claim 1, wherein the corrugated part comprises a plurality of ridges and valleys that are alternately disposed,
wherein a distance difference between an external diameter at each of the ridges and an external diameter at each of the valleys is 2.8 to 3.2 mm.

11. The refrigeration circuit of claim 1, wherein the corrugated part comprises a plurality of ridges and valleys that are alternately disposed,
wherein an external diameter (O2) at each of the valleys has a difference of exceeding 0 to 2% or less than an external diameter (O1) at a region in which the corrugated part does not exist,
wherein an internal diameter (I'') at each of the valleys has a difference of exceeding 0 to 2% or less than an inner diameter (I1) at the region in which the corrugated part does not exist.

12. The refrigeration circuit of claim 1, wherein the stainless steel pipe has a copper junction part (430$f$, 430$g$) at at least one end portion thereof,
wherein the copper junction part is made of a copper material having a shape of a linear pipe, and is coupled to an outer circumferential surface or an inner circumferential surface of the end portion.

13. The refrigeration circuit of claim 1, wherein an American Society for Testing and Materials (ASTM) grain size number of the stainless steel is 5.0 to 7.0.

14. The refrigeration circuit of claim 1, wherein the stainless steel has an austenite matrix structure of 99% or greater based on a grain size area thereof.

15. The refrigeration circuit of claim 14, wherein the stainless steel has a δ-ferrite matrix structure of 1% or less based on the grain size area thereof.

16. A refrigeration circuit comprising:
a compressor to compress a refrigerant; and
a stainless steel pipe that is coupled to the compressor, the stainless steel pipe having a corrugated part,
wherein the stainless steel pipe comprises an austenite matrix structure having an average diameter of 30 to 60 μm, and
wherein the stainless steel has an austenite matrix structure of 99% or more based on a grain size area thereof, and has a δ-ferrite matrix structure of 1% or less based on the grain size area thereof.

17. The refrigeration circuit of claim 16, wherein the corrugated part is integrated with the stainless steel pipe.

18. The refrigeration circuit of claim 16, wherein the corrugated part comprises a plurality of ridges and valleys that are alternately disposed.

* * * * *